(12) United States Patent
Kamath et al.

(10) Patent No.: US 9,235,371 B2
(45) Date of Patent: Jan. 12, 2016

(54) PROCESSING PRINT REQUESTS

(75) Inventors: Harish B Kamath, Bengalooru Karanataka (IN); Hean Koon Koay, Singapore (SG); Rahul Kumar Srivastava, Bangalore Karnataka (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 13/810,202

(22) PCT Filed: Jul. 15, 2010

(86) PCT No.: PCT/US2010/042048
§ 371 (c)(1),
(2), (4) Date: Jan. 14, 2013

(87) PCT Pub. No.: WO2012/008958
PCT Pub. Date: Jan. 19, 2012

(65) Prior Publication Data
US 2013/0107324 A1    May 2, 2013

(51) Int. Cl.
*G06F 3/12* (2006.01)
*G06F 21/35* (2013.01)
*G06F 21/60* (2013.01)

(52) U.S. Cl.
CPC ............ *G06F 3/1296* (2013.01); *G06F 3/1222* (2013.01); *G06F 3/1238* (2013.01); *G06F 3/1288* (2013.01); *G06F 21/35* (2013.01); *G06F 21/608* (2013.01); *G06F 2221/2121* (2013.01)

(58) Field of Classification Search
None
See application file for complete search history.

(56) References Cited

U.S. PATENT DOCUMENTS

| | | | | |
|---|---|---|---|---|
| 5,633,932 A | * | 5/1997 | Davis | B41J 29/54 340/5.86 |
| 5,978,559 A | * | 11/1999 | Quinion | G06F 3/1297 358/1.15 |
| 5,995,721 A | * | 11/1999 | Rourke | G06F 3/1203 358/1.13 |
| 6,075,615 A | * | 6/2000 | Nakamura | G06F 3/1203 358/1.14 |
| 6,219,148 B1 | * | 4/2001 | Takashima | G06F 3/1204 358/1.13 |
| 6,288,790 B1 | * | 9/2001 | Yellepeddy | G06F 3/1204 358/1.13 |
| 6,353,484 B1 | * | 3/2002 | Takashima | G06F 3/1204 358/1.13 |
| 6,412,022 B1 | * | 6/2002 | Kumpf | H04N 1/00236 710/1 |
| 6,498,656 B1 | * | 12/2002 | Mastie | G06F 3/1259 358/1.13 |
| 6,621,589 B1 | * | 9/2003 | Al-Kazily | G06F 3/1205 358/1.15 |
| 6,874,034 B1 | * | 3/2005 | Hertling | G06F 3/1204 709/201 |
| 6,938,154 B1 | * | 8/2005 | Berson | G06F 21/33 713/155 |

(Continued)

FOREIGN PATENT DOCUMENTS

CN    101122847    2/2008
EP    1465052 A2    10/2004

(Continued)

OTHER PUBLICATIONS

David Kappos, Subject Matter Eligibility of Computer Readable Media, US Patent and Trademark Office, Feb. 23, 2010, 1351 OG 212.*

(Continued)

Primary Examiner — Ted Barnes
(74) Attorney, Agent, or Firm — Mannava & Kang, PC

(57) ABSTRACT

A request to print a file at a printer is received at a first computer system over a public network. Responsive to receiving the request, an indication of the request is exposed to the printer to enable fulfillment, by the printer, of the request to print the file.

2 Claims, 5 Drawing Sheets

(56) References Cited

U.S. PATENT DOCUMENTS

| | | | | |
|---|---|---|---|---|
| 6,943,905 B2* | 9/2005 | Ferlitsch | G06F 3/1204 | 358/1.13 |
| 7,187,461 B2* | 3/2007 | Schlonski | G06F 3/1204 | 358/1.15 |
| 7,315,889 B2* | 1/2008 | Ono | G06F 3/1212 | 358/1.14 |
| 7,366,795 B2* | 4/2008 | O'Neil et al. | H04L 29/06 | 709/203 |
| 7,454,482 B2* | 11/2008 | Barnard | H04L 41/0253 | 358/1.13 |
| 7,616,337 B2* | 11/2009 | Hayashi | H04N 1/00204 | 358/1.15 |
| 8,264,726 B2* | 9/2012 | Klassen | G06F 3/1285 | 358/1.15 |
| 8,463,416 B2* | 6/2013 | Ruml | G06Q 10/06 | 700/101 |
| 8,488,144 B2* | 7/2013 | Fujimori | G06F 3/1208 | 358/1.15 |
| 8,537,402 B2* | 9/2013 | Scaff | H04L 43/0817 | 358/1.13 |
| 8,570,585 B2* | 10/2013 | Morales | G06F 3/1204 | 358/1.13 |
| 8,593,676 B2* | 11/2013 | Burke, Jr. | G06Q 30/04 | 358/1.13 |
| 8,630,008 B2* | 1/2014 | Burke, Jr. | G06F 3/1203 | 358/1.15 |
| 8,804,163 B2* | 8/2014 | Kimura | G06F 3/122 | 358/1.1 |
| 8,836,987 B2* | 9/2014 | Gaertner | G06F 3/1213 | 358/1.1 |
| 2002/0038286 A1* | 3/2002 | Koren | G06Q 20/02 | 705/40 |
| 2002/0044299 A1* | 4/2002 | Iwase | H04L 29/06 | 358/1.15 |
| 2003/0002072 A1* | 1/2003 | Berkema | G06F 3/1205 | 358/1.15 |
| 2003/0005097 A1* | 1/2003 | Barnard | H04L 41/0253 | 709/223 |
| 2003/0005100 A1* | 1/2003 | Barnard et al. | H04L 29/12113 | 709/223 |
| 2003/0078965 A1* | 4/2003 | Cocotis | H04L 63/029 | 709/203 |
| 2003/0093670 A1* | 5/2003 | Matsubayashi | G06F 3/1212 | 713/168 |
| 2003/0182378 A1* | 9/2003 | Treptow | H04L 12/58 | 709/206 |
| 2004/0230646 A1* | 11/2004 | Clough | G06F 3/1204 | 709/203 |
| 2005/0096048 A1* | 5/2005 | Clare | H04W 12/06 | 455/433 |
| 2005/0138065 A1* | 6/2005 | Ciriza | G06Q 10/10 | 1/1 |
| 2005/0235141 A1* | 10/2005 | Ibrahim | G06F 21/57 | 713/164 |
| 2005/0270569 A1* | 12/2005 | Hayashi | H04N 1/00204 | 358/1.15 |
| 2006/0012828 A1* | 1/2006 | Ohta | H04L 67/04 | 358/1.18 |
| 2006/0082807 A1* | 4/2006 | Tanaka | G06F 3/1204 | 358/1.15 |
| 2006/0197975 A1* | 9/2006 | Chevalier et al. | G06F 3/1204 | 358/1.15 |
| 2007/0027990 A1* | 2/2007 | Nakaoka | G06F 3/1204 | 709/226 |
| 2007/0046994 A1* | 3/2007 | Morales | G06F 3/1204 | 358/1.16 |
| 2007/0086051 A1* | 4/2007 | Kunori | H04N 1/00127 | 358/1.15 |
| 2007/0182986 A1* | 8/2007 | Ciriza | G06F 21/608 | 358/1.15 |
| 2008/0037062 A1* | 2/2008 | Omino | G06F 21/305 | 358/1.15 |
| 2008/0059804 A1* | 3/2008 | Shah | G06F 21/41 | 713/186 |
| 2008/0080003 A1* | 4/2008 | Ferlitsch | G03G 15/553 | 358/1.16 |
| 2008/0231886 A1* | 9/2008 | Wehner | G06F 3/1204 | 358/1.15 |
| 2008/0256616 A1* | 10/2008 | Guarraci | H04L 63/08 | 726/9 |
| 2008/0300707 A1* | 12/2008 | Ruml | G06Q 10/06 | 700/101 |
| 2009/0002770 A1* | 1/2009 | Cavill | H04N 1/00204 | 358/402 |
| 2009/0009802 A1* | 1/2009 | Shaw | G06F 21/608 | 358/1.15 |
| 2009/0019534 A1* | 1/2009 | Bakshi | G06F 21/335 | 726/6 |
| 2009/0248632 A1* | 10/2009 | Subramanian | G06Q 30/06 | 1/1 |
| 2009/0268247 A1* | 10/2009 | Ruml | G06Q 10/06 | 358/1.15 |
| 2009/0327496 A1 | 12/2009 | Klemets et al. | | |
| 2010/0309508 A1* | 12/2010 | Kamath | G06F 3/1204 | 358/1.15 |
| 2011/0026073 A1* | 2/2011 | Wu | G06F 3/1206 | 358/1.15 |
| 2011/0176162 A1 | 7/2011 | Kamath et al. | | |
| 2011/0235085 A1* | 9/2011 | Jazayeri | G06F 3/1204 | 358/1.14 |
| 2011/0299110 A1* | 12/2011 | Jazayeri | G06F 3/1204 | 358/1.15 |
| 2012/0019867 A1* | 1/2012 | Prati | G06F 3/1204 | 358/1.15 |
| 2012/0057193 A1* | 3/2012 | Jazayeri | G06F 3/1204 | 358/1.15 |
| 2012/0140285 A1* | 6/2012 | Kamath | G06F 3/1204 | 358/1.15 |

FOREIGN PATENT DOCUMENTS

| | | |
|---|---|---|
| JP | 2002108583 A | 4/2002 |
| JP | 2003216397 A | 7/2003 |
| JP | 2008040991 A | 2/2008 |
| JP | 2008194942 A | 8/2008 |
| JP | 2009025946 A | 2/2009 |
| JP | 2009259292 A | 11/2009 |
| JP | 2010128555 A | 6/2010 |
| WO | WO-2009/039160 A2 | 3/2009 |
| WO | WO-2010/035281 A1 | 4/2010 |

OTHER PUBLICATIONS

HP ePrint Enterprise Mobile Printing Solution, 4AA0-1601ENW, Mar. 2010, pp. 1-2, Available at: <mtbtv-new.s3.amazonaws.com/Media/WhitePapers/10%20HP%20ePrint%20Enterprise%20_Solution%20brief_4AA0-1601ENW-FINAL.pdf>, Hewlett-Packard Development Company, L.P.

International Search Report and Written Opinion, International Application No. PCT/US2010/042048, Date of Mailng: Feb. 28, 2011, pp. 1-8.

Ping Identity Corporation, "Ping Identity Teams with Google Enterprise to Deliver Universal Login for SaaS", Jul. 28, 2009, Denver,CO., 2 pages.

GitHub inc,, "Caching your GitHub password in Git," Jan. 7, 2010, <https://help.github.comfarticlesicaching-your-github-password-in-git/>.

Heinz Tschabitscher, "How to Make Outlook Remember Your Email Password." Mar. 25, 2009, <http://web.arthive.org/web/20090325001438/http://email.about.com./od/outlooktips/qt/et_remember_pwd.htm>.

International Bureau, International Preliminary Report on Patentability, issued in: International Application No. PCT/US2010/042048, issued Jan. 15, 2013, 7 pages.

Internet Engineering Task Force (IETF), "The OAuth 1.0 Protocol," Apr. 2010, Request for Comments: 5849 (RFC 5849), <http://tools.ietf.org/pdf/rfc5849.pdf>.

John E. Dunn, "Too Many People Reuse Logins, Study Finds," Feb. 7, 2010, <http://www.pcworld.com/article/188763/too_many_people_reuse_logins_study_finds.html>.

(56) References Cited

OTHER PUBLICATIONS

Supplementary European Search Report received in EP application No. 10854825.6, Nov. 6, 2014, 10 pages.

The Open Group, "Introduction to Single Sign-On," Aug. 22, 2009, <http://web.archive.org/web/20090822062226/http://www.opengroup.org/security/sso/sso_intro.htm>.

Wavelength Media, "Autocomplete in IE 7," May 11, 2008, <http://www.mediacollege.com/microsoft/internet-explorer/7/autocomplete.html>.

Wikipeda, "Single sign-on," Jun. 24, 2010, <https://en.wikipedia.org/w/index.php?title=Single_sign-on&oldid=369962035>.

* cited by examiner

PROCESSING PRINT REQUESTS

FIELD

This disclosure relates to processing print requests.

BACKGROUND

A printer is a hardware device that converts files (e.g., documents) into hardcopy form, for example on physical print media such as paper. A printer may be connected to a computer as a local peripheral device. Additionally or alternatively, a printer may have a network interface that enables the printer to be connected to multiple computers over a local area network (LAN) or a private corporate or enterprise intranet.

DETAILED DESCRIPTION

Figure 1:
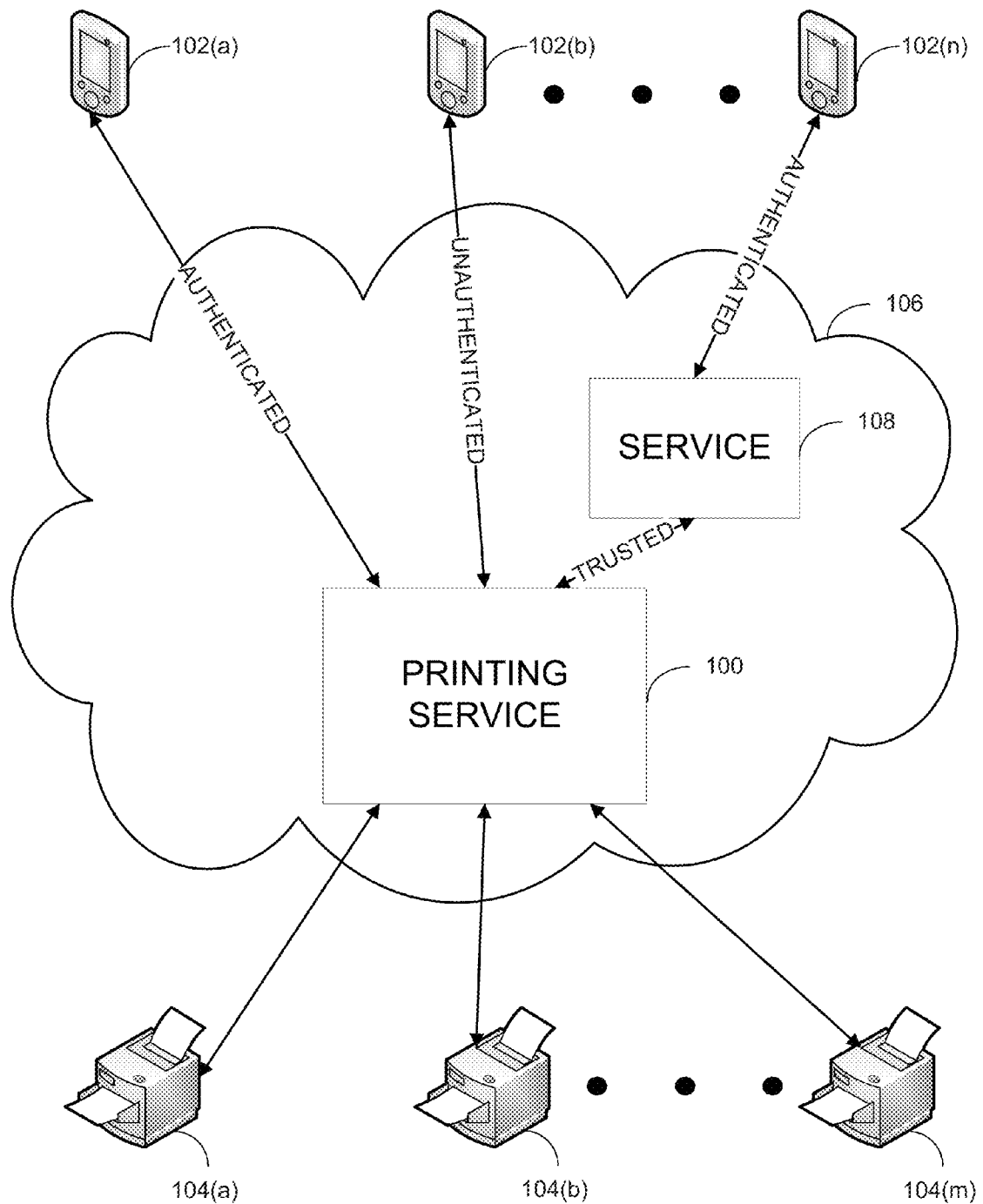
FIG. 1 is a block diagram of an example of an electronic communications network.

A hosted printing service executes on a system of one or more computing devices (e.g., servers). This hosted printing service is accessible to one or more remote computing devices and one or more remote printers over a network connection (e.g., the Internet). The hosted printing service is configured to receive requests from the remote computing devices to print files (e.g., documents) at specific ones of the remote printers and to relay such received requests to the appropriate printers for fulfillment. In this manner, the hosted printing service may enable a user to fulfill a request to print a file at a printer that otherwise may not be available to the user, for instance because the printer resides on a private network (perhaps behind a firewall) and is not accessible to the user's device over a public network connection and/or because the user's device is not configured to submit print requests directly to the printer.

For example, a businessperson who is traveling on business may view a file using an e-mail client application executing on a Smartphone and then decide that he/she would like to have a hardcopy of the file for the remainder of his/her trip. However, the businessperson's Smartphone may be blocked from accessing the network on which the printers available at the businessperson's hotel reside and/or the businessperson's Smartphone may not be appropriately configured to submit print requests to the printers available at the businessperson's hotel, for instance because the businessperson's Smartphone lacks the necessary drivers required to transmit print requests the printers. Nevertheless, the hosted printing service, which may be accessible by the businessperson's Smartphone over the Internet, may be configured to be able to establish connections with the printers available at the businessperson's hotel. As such, the hosted printing service may enable the businessperson to print the file at the businessperson's hotel by submitting a request to print the file from the businessperson's Smartphone over the Internet to the hosted printing service, which in turn relays the printing request to one of the printers available at the businessperson's hotel.

In addition to being accessible to one or more remote computing devices, the hosted printing service also is accessible to one or more other hosted services (e.g., web services) executing on one or more computing devices (e.g., servers) responsive to other remote computing devices. Furthermore, the hosted printing service is configured to receive requests from these hosted services to print files at specific ones of the remote printers and to relay such received requests to the appropriate printers for fulfillment. In this manner, the hosted printing service may enable a user who is using a computing device to access a web service to print a file from the web service at a desired printer irrespective of whether the desired printer is accessible to the user's computing device over a network connection and/or the user's computing device is configured to submit print requests directly to the desired printer. Moreover, even if the user's computing device is connected to the desired printer and the user's computing device is appropriately configured to submit print requests to the desired printer, the hosted printing service may enable the user to print the file from the web service without requiring the user to download the file from the web service to the user's computing device and, thereafter, submit a request to the desired printer to print the downloaded file.

For example, a parent may be using the parent's home computer to access a photograph sharing web service to process photographs of the parent's children that the parent previously uploaded to the photograph sharing web service and that now are hosted by and accessible through the photograph sharing web service. While browsing the photographs of his/her family hosted by and accessible through the photograph sharing web service, the parent may decide that he/she wants to print a hardcopy of one of the photographs. However, the parent's home computer may not be connected to a printer or the parent may desire to have the photograph printed on a printer that has better photograph printing capabilities than a printer connected to the parent's home computer. Nevertheless, the hosted printing service may be accessible to the photograph sharing web service such that the parent may use the parent's home computer to instruct the photograph sharing web service to interact with the hosted printing service to submit a print request to the printer at which the parent desires to print the photograph even if the desired printer is not accessible to the parent's home computer over a network connection, the parent's home computer is not configured to submit print requests directly to the desired printer, and/or the photograph sharing web service does not have access to the desired printer over a network connection.

While the hosted printing service may provide access to users to many printers to which the users otherwise would not have access—be such access directly through the hosted printing service or indirectly through a web service that has access to the hosted printing service—it also may subject the printers with which it collaborates to fulfill print requests to many print requests to which these printers otherwise would not be exposed. Therefore, the hosted printing service, independently or in conjunction with the printers with which it collaborates, employs mechanisms for processing print requests that are intended to restrict the print requests that are fulfilled by the printers to print requests that are authorized by one or both of the hosted printing service and the owners of the printers.

For example, in some implementations, the hosted printing service may require a user to authenticate him/herself with the hosted printing service before relaying a print request received on behalf of the user via an electronic device associated with the user to a particular printer. Additionally or alternatively, when the hosted printing service receives a print request on behalf of a user who has not been authenticated by the hosted printing service, the hosted printing service may relay the print request to a designated printer with an indication that specifies that the print request is not to be fulfilled until authorized locally by an entity at the printer. In such cases, the printer may be coupled to an interactive computing device that includes a display, and the printer may solicit authorization or denial of the pending print request from an associated user by causing the display to generate a visual indication of the pending print request and/or the identity of the submitter of the pending print request. Only after receiving authorization to proceed may the printer fulfill the print request. Furthermore, the hosted printing service only may allow web services with whom previously established trusted relationships exist to submit print requests via the hosted printing service. In this manner, the hosted printing service may regulate the print requests that are relayed to and fulfilled by the printers with which the hosted printing service collaborates in an effort to reduce the undesired or unauthorized print requests fulfilled by the printers.

FIG. 1 is a block diagram of an example of an electronic communications network that includes an example of a hosted printing service 100. For illustrative purposes, several elements illustrated in FIG. 1 and described below are represented as monolithic entities. However, these elements each may include and/or be implemented on numerous interconnected computing devices and other components that are designed to perform a set of specified operations and that may be dedicated to a particular geographical region or, alternatively, that may be distributed across two or more disparate geographic locations.

As illustrated in FIG. 1, hosted printing service 100 is accessible to a number of electronic user devices 102(a)-102(n) and a number of printers 104(a)-104(m) over a network 106. In some implementations, network 106 may be a public network and electronic user devices 102(a)-102(n) may reside on or have access to network 106 through one or more corresponding private networks. Similarly, printers 104(a)-104(m) may reside on or have access to network 106 through one or more corresponding private networks. As such, electronic user devices 102(a)-102(n) may not be able to access printers 104(a)-104(m) over a public network connection.

Electronic user devices 102(a)-102(n) may include one or more general-purpose computers capable of responding to and executing instructions in a defined manner (e.g., personal computers, including desktop, laptop, tablet, and netbook computers, Smartphones, and personal digital assistants (PDAs)), one or more special-purpose computers, and/or one or more combinations of general purpose and special-purpose computers.

Individual electronic user devices 102(a)-102(n) typically have internal or external storage components for storing data and programs such as an operating system and one or more application programs. Examples of application programs include authoring applications (e.g., word processing programs, database programs, spreadsheet programs, or graphics programs) capable of generating documents or other electronic content; client applications (e.g., e-mail clients) capable of communicating with other computer users, accessing various computer resources, and viewing, creating, or otherwise manipulating electronic content; and browser applications capable of rendering standard Internet content and, in some cases, also capable of supporting a web-based e-mail client.

Furthermore, individual electronic user devices 102(a)-102(n) also typically include central processing units (CPUs) for executing instructions stored in storage and/or received from one or more other electronic devices, for example over network 106. Individual electronic user devices 102(a)-102(n) also usually include communication devices for sending and receiving data. One example of such communications devices is a modem. Other examples include antennas, transceivers, communications cards, and other network adapters capable of transmitting and receiving data over network 106 through a wired or wireless data pathway.

Hosted printing service 100 may be implemented using one or more computing devices (e.g., servers) configured to provide a service to one or more client devices (e.g., electronic user devices 102(a)-102(n)) connected to hosted printing service 100 over network 106. The one or more computing devices on which hosted printing service 100 is implemented may have internal or external storage components storing data and programs such as an operating system and one or more application programs. The one or more application programs may be implemented as instructions that are stored in the storage components and that, when executed, cause the one or more computing devices to provide the features of the hosted printing service described herein.

Furthermore, the one or more computing devices on which hosted printing service 100 is implemented each may include one or more processors for executing instructions stored in storage and/or received from one or more other electronic devices, for example over network 106. In addition, these computing devices also typically include network interfaces and communication devices for sending and receiving data.

Network 106 may provide direct or indirect communication links between hosted printing service 100, electronic user devices 102(a)-102(n), and printers 104(a)-104(m) irrespective of physical separation between any of such devices. As such, individual ones of hosted printing service 100, electronic user devices 102(a)-102(n), and printers 104(a)-104(m) may be located in close geographic proximity to one another or, alternatively, individual ones of hosted printing service 100, electronic user devices 102(a)-102(n), and printers 104(a)-104(m) may be distributed across vast geographic distances. Examples of network 106 include the Internet, the World Wide Web, WANs, LANs, analog or digital wired and wireless telephone networks, radio, television, cable, satellite, and/or any other delivery mechanisms for carrying data.

In addition to enabling electronic communications between hosted printing service 100 and electronic user devices 102(a)-102(n) as well as printers 104(a)-104(m), network 106 also enables communications between hosted printing service 100 and one or more web services 108.

Web services typically are computing applications that are executed on computing devices (e.g., servers) responsive to interaction with and instruction from remote and distinct computing devices (e.g., electronic user devices 102(a)-102(n)) that are capable of communicating with the web services over a network (e.g., network 106). In this manner, web services may be said to "provide services" to the one or more remote and distinct computing devices responsive to which the web services execute. For example, as illustrated in FIG. 1, electronic user device 102(n) accesses web service 108 over network 106 in order to take advantage of a service provided by web service 108. One convenience of web services is that the computing devices on which they are implemented may be separated by vast geographic distances from the remote computing devices responsive to which they are executing, and yet the web services still are able to provide these computing devices with the functionality and processing power required to perform desired tasks for the remote computing devices.

There are a multitude of different types of web services, but, to name only a few examples, web services may provide photograph processing and sharing functionality, business marketing material design functionality, and word or data processing to remote computing devices. In many cases, a web service may enable users who are accessing the web service using remote electronic user devices to access, manipulate, or otherwise interact with data or files that are stored by the web service as opposed to by storage that is local to the electronic user devices the users are using to access the web service. For example, photograph processing and sharing web services may enable users to access and manipulate photographs that are stored by the web services, while business marketing design web services may enable users to generate and manipulate business marketing materials that are stored by the web services and word or data processing web services may enable users to generate and manipulate documents, spreadsheets, and other files that are stored by the web services.

In such cases, it may be advantageous to a user of such a web service for the web services to provide the user with the ability to print data or files that are stored on behalf of the user by the web service. For example, it might be advantageous to a user of a photograph sharing web service to be able to print one or more photographs stored by the web service through the web service. Similarly, it might be advantageous to a user of a business marketing design web service to be able to print business marketing materials stored by the web service through the web service while it also might be advantageous to a user of a word or data processing web service to be able to print a document, spreadsheet, or other file stored by the web service through the web service. However, a web service itself might not have the capability to interface with printers in order to print data or files that are stored on the web service on behalf of users of the web service. Therefore, hosted printing service 100 may be configured to collaborate with a web service, such as, for example, web service 108 in order to provide printing services for the web service 108.

Hosted printing service 100 is configured to receive print requests from both electronic user devices 102(*a*)-102(*n*) and one or more web services 108 and, as appropriate, to relay these print requests to specific ones of printers 104(*a*)-104(*m*) for fulfillment. In this manner, hosted printing service 100 enables electronic user devices 102(*a*)-102(*n*) to submit and have print requests fulfilled by specific ones of printers 104(*a*)-104(*m*) irrespective of whether electronic user devices 102(*a*)-102(*n*) are able to access individuals ones of printers 104(*a*)-104(*m*) over a network connection and/or whether electronic user devices 102(*a*)-102(*n*) properly are configured to submit print requests to or otherwise communicate with individual ones of printers 104(*a*)-104(*m*).

There may be many reasons why a particular electronic user device 102 may be unable to access a particular printer 104 over a network connection. For example, the particular electronic user device 102 may be a Smartphone or tablet computer that has access to the Internet over a wireless connection (e.g., a wireless LAN (WLAN) including a WLAN based on the IEEE 802.11 standard, a radio frequency-based wireless network, and/or a cellular or mobile telephony network provided by a wireless service provider) made available by a private service provider, and the particular printer 104 to which the user of the electronic user device 102 wants to print a file may reside on a different private LAN that is connected to the Internet through a firewall (not shown) that blocks incoming communications from unknown or unauthorized devices such as the electronic user device 102.

Similarly, there may be many reasons why a particular electronic user device 102 may not be configured appropriately to submit a print request to or otherwise communicate with a particular printer 104. For example, the required drivers for electronic user device 102 may not be installed on the electronic user device and/or the electronic user device may not know the correct network address (e.g., IP address) for the printer 104 even if the electronic user device 102 and the particular printer 104 reside on the same private network (not shown).

Hosted printing service 100, electronic user devices 102(*a*)-102(*n*), web service 108, and printers 104(*a*)-104(*m*) may employ various different techniques in order to communicate with each other and to fulfill print requests submitted by electronic user devices 102(*a*)-102(*n*) and/or web service 108.

For example, in some implementations, hosted printing service 100 provides an application programming interface (API) that electronic user devices 102(*a*)-102(*n*), web service 108, and printers 104(*a*)-104(*m*) may utilize to communicate with hosted printing service 100 to submit and fulfill print requests. In certain implementations, the API may be a Representational State Transfer (REST) API. The REST framework specifies resources that are referenced by global identifiers (such as uniform resource identifiers or URIs). To manipulate such resources, hosted printing service 100 and printers 104(*a*)-104(*m*) may communicate using a standardized interface such as Hypertext Transfer Protocol (HTTP).

The API provided by hosted printing service 100 may includes various API routines (or methods) that can be invoked by applications executing at printers 104(*a*)-104(*m*) and/or at the hosted printing service 100. Using the REST API may facilitate integration since the API routines can be used to perform communications associated with performing print-related services without having to address conflicts or inconsistencies that may arise due to use of different operating systems in different nodes (e.g., electronic user devices 102(*a*)-102(*n*), the computing devices on which hosted printing service 100 is implemented, and/or printers 104(*a*)-104(*m*)). Also, using the REST API may make it unnecessary for printer device drivers to be installed on electronic user devices 102(*a*)-102(*n*) to enable access to printers 104(*a*)-104(*m*) or other print-related services.

One issue that may be encountered by electronic user devices 102(*a*)-102(*n*) when accessing a hosted printing service such as hosted printing service 100 is that differences in platforms, document format variances, unavailability of software, and/or other problems may prevent recognition of documents such that printing or other print-related services are difficult or impossible to be performed. Therefore, in some cases, format conversion may be performed to address this issue. In such cases, format conversion may be performed at any of electronic user devices 102(*a*)-102(*n*), hosted printing service 100, and/or printers 104(*a*)-104(*m*).

User electronic devices 102(*a*)-102(*n*) and/or web service 108 may utilize the REST API in order to submit print requests to hosted printing service 100. Upon receiving a print request from one of electronic user devices 102(*a*)-102(*n*) or web service 108, hosted printing service 100 may identify which of printers 104(*a*)-104(*m*) was identified as the printer to fulfill the print request and, then, hosted printing service 100 may add the print request to a print request queue corresponding to the particular printer requested to fulfill the print request.

Intermittently (e.g., periodically), individual ones of printers 104(a)-104(m) may utilize the REST API to query hosted printing service 104(a)-104(m) to determine whether any print requests are pending for the individual printers at hosted printing service 100. Responsive to such queries, hosted printing service 100 determines whether a print request queue corresponding to a printer from which a query was received includes any pending print requests for the querying printer, and, in response to determining that the queue does include one or more print requests for the printer, hosted printing service 100 transmits, for example using the REST API, the one or more pending print requests for the printer to the printer for fulfillment.

Using the REST API to query hosted printing service 100 for pending print requests and, thereafter, to receive pending print requests from hosted printing service 100 may enable individual ones of printers 104(a)-104(m) to receive print requests from hosted printing service 100 even if the printers 104(a)-104(m) reside on private networks behind firewalls that otherwise would block inbound communications from being relayed to printers 104(a)-104(m).

While hosted printing service 100 provides electronic user devices 102(a)-102(n) and web service 108 with access to many printers 104(a)-104(m) which otherwise may not be accessible to electronic user devices 102(a)-102(n) and web service 108, thereby providing users of electronic user devices 102(a)-102(n) and web service 108 with greater flexibility when it comes to printing files from electronic user deices 102(a)-102(n) or web service 108, hosted printing service 100 consequently also subjects printers 104(a)-104(m) to the potential of receiving many more print requests than they otherwise might receive. Therefore, hosted printing service 100 either independently or in conjunction with printers 104(a)-104(m) may enforce one or more policies in an effort to prevent individual ones of printers 104(a)-104(m) from being made target of "spam" printing campaigns and to ensure that individual ones of printers 104(a)-104(m) only receive and ultimately fulfill those print requests that their corresponding owners or operators intend to be fulfilled.

In particular, one mechanism that hosted printing service 100 employs is an authentication service that authenticates users and/or the electronic user devices 102(a)-102(n) used by the users to access hosted printing service 100 before fulfilling print requests submitted by the electronic user devices 102(a)-102(n). For example, as illustrated in FIG. 1, electronic user device 102(a) has established an authenticated communications session with hosted printing service 100.

Various different techniques may be employed by hosted printing service 100 in order to authenticate users and/or the electronic user devices 102(a)-102(n) that users use to access hosted printing service 100. For example, in some implementations, hosted printing service 100 may require that a user submit a registered user name or other identifier (e.g., account number) and verified password to hosted printing service 100 in order to establish an authenticated communications session with hosted printing service 100. Additionally or alternatively, hosted printing service 100 may require an electronic user device to submit a verified digital certificate to hosted printing service 100 and/or to engage in a challenge and response authentication scheme in order to establish an authenticated communications session with hosted printing service 100.

Whatever the case, after electronic user device 102(a) has established an authenticated communications session with hosted printing service 100, hosted printing service 100 may enable electronic user device 102(a) to have print requests fulfilled by one or more printers 104(a)-104(m) accessible through hosted printing service 100. In some implementations, after electronic user device 102(a) has established an authenticated communications session with hosted printing service 100, hosted printing service 100 may enable electronic user device 102(a) to have print requests fulfilled by all printers accessible through hosted printing service 100.

In alternative implementations, after electronic user device 102(a) has established an authenticated communications session with hosted printing service 100, hosted printing service 100 only may enable electronic user device 102(a) to have print requests fulfilled by a subset of less than all of the printers 104(a)-104(m) accessible through hosted printing service 100. For example, hosted printing service 100 may offer subscriptions to use hosted printing service 100 that entitle users to be able to access only a certain class of printers (e.g., printers having certain limited or specified capabilities) or printers in a certain geographic area. Additionally or alternatively, hosted printing service 100 may enable electronic user device 100 to access only a certain subset of the printers 104(a)-104(m) accessible through hosted printing service 100 that the owners or operators of the printers have designated as being available to the user of electronic user device 100. For example, hosted printing service 100 only may enable electronic user device 102(a) to have print requests fulfilled by those printers accessible through hosted printing service 100 that are owned by the employer of the user of electronic user device and/or those printers accessible through hosted printing service 100 that are owned by a commercial service with whom the user of the electronic user device 100 has an account that entitles the user to have print requests fulfilled by printers owned by the commercial service.

In some cases, hosted printing service 100 may accept print requests submitted by electronic user devices 102(a)-102(n) and/or users of the electronic user devices 102(a)-102(n) that have not been authenticated. For example, as illustrated in FIG. 1, electronic user device 102(b) has established a communications session with hosted printing service 100, but that communications session has not been authenticated by hosted printing service 100. In this case, hosted printing service 100 may accept print requests from electronic user device 102(b) and even relay these print requests on to individual ones of the printers 104(a)-104(m) specified by electronic user device 102(b). However, in so doing, hosted printing service 100 may indicate to the individual ones of the printers 104(a)-104(m) to which the print requests are relayed that the print requests have not yet been authenticated. Therefore, before fulfilling these print requests, the implicated printers may require manual authorization from a user to fulfill the print requests.

For example, printers 104(a)-104(m) may include or be coupled to interactive electronic devices capable of displaying messages to and receiving input from a user. When one of printers 104(a)-104(m) receives a print request from hosted printing service 100 identified as not yet having been authenticated, the printer may defer fulfillment of the print request and, instead, cause a message to be displayed on the interactive electronic device that provides details about the unauthenticated print request. Only after a user provides input to the interactive electronic device confirming that the print request should be fulfilled, may the printer fulfill the unauthenticated request. In the event that a user provides input to the interactive electronic device indicating that the unauthorized request should be denied or more than a predefined period of time elapses without receiving instructions, the printer may cancel the unauthenticated print request.

As described above, hosted printing service 100 may enable web service 108 to submit print requests to hosted printing service 100 for fulfillment by one or more of the printers accessible through hosted printing service 100. However, in order to reduce the risk that printers 104(*a*)-104(*m*) will be inundated with illegitimate print requests from web service 108, hosted printing service 100 may employ one or more different mechanisms that regulate the fulfillment of print requests received from web service 108.

In some implementations, hosted printing service 100 only may enable web services with which hosted printing service 100 previously has established a trusted relationship to submit print requests to hosted printing service 100 for fulfillment by one of the printers 104(*a*)-104(*m*) accessible through hosted printing service 100. For example, as illustrated in FIG. 1, web service 108 previously has established a trusted relationship with hosted printing service 100. In order to demonstrate that it previously has establish a trusted relationship with hosted printing service 100, hosted printing service 100 may require a web service to transmit a digital certificate to hosted printing service 100.

As part of the process of or in addition to establishing a trusted relationship with a web service, hosted printing service 100 may require that the web service only submit print requests to hosted printing service 100 that have been generated during the course of communications sessions with electronic user devices or users that have been authenticated by the web service. For example, as illustrated in FIG. 1, electronic user device 102(*n*) has established an authenticated communications session with web service 108. In this manner, hosted printing service 100 may use the authentication of electronic user device 102(*n*) and/or its user performed by web service 108 as a proxy for authenticating electronic user device 102(*n*) and/or its user itself.

Various different techniques may be employed by web service 108 to authenticate electronic user device 102(*n*) and/or its user including those that were described above in connection with the authentication performed by hosted printing service 100.

Due to the fact that web service 108 previously established a trusted relationship with hosted printing service 100 and web service 108 authenticated the communications session established with electronic user device 102(*n*), hosted printing service 100 may relay print requests received from web service 108 that were generated as a result of interaction with electronic user device 102(*n*) to individual ones of the printers 104(*a*)-104(*m*) accessible through hosted printing service 100 for fulfillment. In some implementations, hosted printing service 100 may accept print requests from web services with which hosted printing service 100 has not previously established a trusted relationship and/or hosted printing service 100 may accept print requests that originated from web services with which hosted printing service 100 previously has established a trusted relationship but which were the result of unauthenticated interaction by the trusted web services with electronic user devices and/or their users. However, as with print requests received by hosted electronic communications system 100 directly from electronic user devices with which authenticated communications sessions have not been established, these print requests may be relayed to the appropriate ones of printers 104(*a*)-104(*m*) with an indication that they have not been authenticated such that the implicated printers do not fulfill the print requests until receiving local authorization or confirmation to do so.

Figure 2:
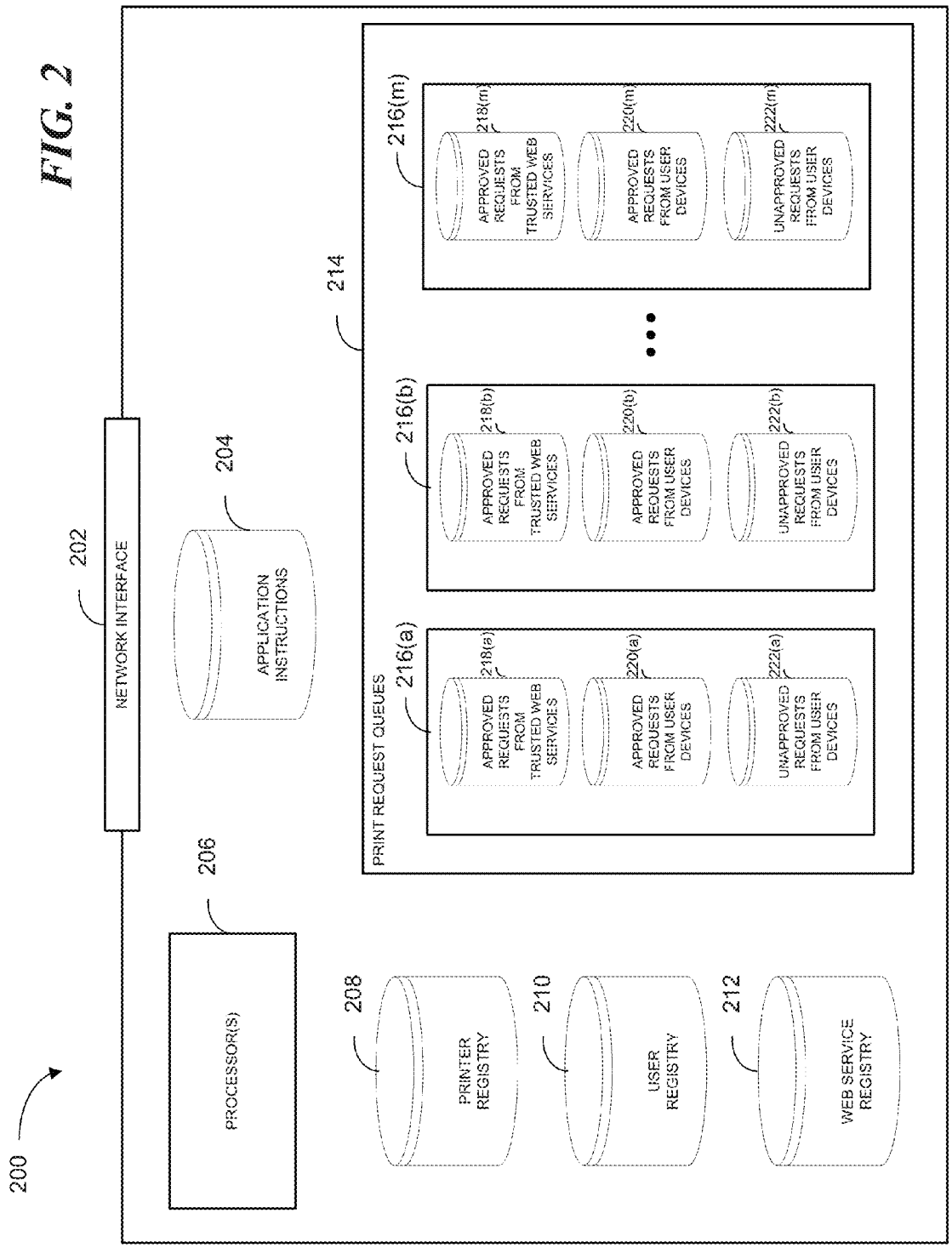
FIG. 2 is a block diagram of an example of a hosted printing service.

FIG. 2 is a block diagram of an example of a hosted printing service 200, for instance the hosted printing service 100 illustrated in FIG. 1. For illustrative purposes, several elements illustrated in FIG. 2 and described below are represented as monolithic entities. However, these elements each may include and/or be implemented on numerous interconnected computing devices and other components that are designed to perform a set of specified operations and that may be dedicated to a particular geographic region or, alternatively, that may be distributed across two or more disparate geographic locations.

As illustrated in FIG. 2, hosted printing service 200 includes a network interface 202 for communicating with one or more remote electronic user devices, web services, and/or printers, a computer memory storage system 204 storing application instructions for providing the functionality made available by hosted printing service 200, and one or more processors 206 for executing instructions, for example, from computer memory storage system 204 and/or one or more other electronic devices. As described above, when the application instructions stored in computer memory storage system 204 are executed by processor(s) 206, they cause hosted printing service system 200 to receive print requests from one or more remote electronic user devices and/or one or more other web services and relay these requests to one or more appropriate printers for fulfillment.

Hosted printing service 200 also includes a computer memory storage system 208 storing a printer registry, a computer memory storage system 210 storing a user registry, and a computer memory storage system 212 storing a web service registry.

Hosted printing service 200 may perform a printer registration process each time a new printer indicates a desire to make itself available to hosted printing service 200 in order to fulfill print requests received by hosted printing service 200 from electronic user devices. For example, hosted printing service 200 may expose an API and/or a user interface that enables printers or resources affiliated with such printers (e.g., personal computers having administrator privileges for the printers) to register with hosted printing service 200 such that the printers, thereafter, can collaborate with hosted printing service 200 to fulfill print requests received by hosted printing service 200.

As part of this registration process, when a new printer registers with hosted printing service 200, hosted printing service 200 may collect a variety of information about the new printer including, for instance, a network address (e.g., IP address and/or media access control (MAC) address) for the new printer, a location (e.g., latitude and longitude coordinates, GPS coordinates, street address, building name/number, building floor, floor location) of the new printer, capabilities (e.g., formats supported, printing technology (e.g., inkjet or laser), pages per minute, color or black and white, page sizes, resolution) of the new printer, protocols for communicating with the new printer, manufacturer and model of the new printer, textual description of the new printer (e.g., a printer name), an owner/operator of the new printer, and/or access rights specifying rules about who is allowed to submit print requests to the new printer.

This information gathered by hosted printing service 200 then may be recorded in the printer registry stored in computer memory storage system 208, which records information about the different printers with which hosted printing service 200 is configured to and authorized to collaborate to fulfill print requests received from remote electronic user devices and/or web services. Thus, for each printer with which hosted printing service 200 is configured to and authorized to collaborate, the printer registry stored in computer memory storage system 208 may store a network address, a location, indications of capabilities provided, information about communication protocols for communicating with the printer, an indication of the manufacturer and model of the printer, a textual description about the printer, an indication of the owner/operator of the printer, and/or rules about who is allowed to submit print requests.

Hosted printing service 200 also may perform a user registration process each time a new electronic user device and/or user of a new electronic user device indicates a desire to take advantage of the services provided by hosted printing service 200. For example, hosted printing service 200 may expose an API and/or a user interface that enables electronic user devices and/or users of electronic user devices to register with hosted printing service 200 in order to access the services provided by hosted printing service 200.

As part of this user registration process, when a new user of an electronic user device and/or a new electronic user device registers with hosted printing service 200, hosted printing service 200 may collect a variety of information about the new user and/or electronic user device including, for instance, in the case of a new user, a name of the new user, a street address of the new user, authentication information (e.g., a user name or other identifier and a corresponding password, a digital certificate) for the new user, billing information (e.g., credit card information) for the new user (e.g., in case the user desires to have print requests fulfilled at printers that charge a fee to do so), an indication of printers registered with hosted printing service 200 that the new user is allowed to access, printer preference information (e.g., information about preferred types and capabilities of printers), and/or identifying information for different devices the new user may use to access hosted printing service 200.

This information gathered by hosted printing service 200 then may be recorded in the user registry stored in computer memory storage system 210, which records information about the different users of electronic user devices and/or electronic user devices that have registered with hosted printing service 200 so as to be able to access the services provided by hosted printing service 200. Thus, for each user registered with hosted printing service 200, the user registry stored in computer memory storage system 210 may store the user's name, street address, authentication information, billing information, an indication of printers registered with hosted printing service 200 that the user is allowed to access, printer preference information, and/or identifying information for different devices the user may use to access hosted printing service 200.

As discussed above, hosted web service 200 is configured to receive print requests from other web services and to collaborate with printers to fulfill such print requests received from these web services. As also discussed above, hosted web service 200 may require the formation of a trusted relationship with another web service before accepting print requests from the web service. To facilitate the formation of such trusted relationships with web services, hosted printing service 200 may perform a web service registration process each time a new web service indicates a desire to be able to access the services provided by hosted printing service 200. For example, hosted printing service 200 may expose an API and/or a user interface that enables web services or resources affiliated with such web services (e.g., personal computers having administrator privileges for the web services) to register with hosted printing service 200 such that the web services, thereafter, can access the services provided by hosted printing service 200. In some implementations, hosted printing service 200 may require that a web service authenticate users who access services provided by the web services before establishing a trusted relationship with the web service.

As part of this registration process, when a new web service registers with hosted printing service 200, hosted printing service 200 may collect a variety of information about the new web service including, for instance, a name of the new web service, authentication information for the new web service, and/or communication protocols for communicating with the new web service.

This information gathered by hosted printing service 200 then may be recorded in the web service registry stored in computer memory storage system 212, which records information about the different web services with which hosted printing service 200 maintains a trusted relationship. Thus, for each web service with which hosted printing service 200 maintains a trusted relationship, the web service registry stored in computer memory storage system 212 may store a name of the web service, authentication information for the web service, and/or communication protocols for communicating with the web service.

Hosted printing service 200 also includes a computer memory storage system 214 configured to store print request queues 216(a)-216(m) for each printer with which hosted printing service 200 is configured to collaborate with to fulfill print requests received from electronic user devices. When hosted printing service 200 receives a print request to be fulfilled by a specific printer, hosted printing service 200 stores the print request in the print request queue 216 corresponding to the specific printer and exposes this print request queue to the specific printer so that the specific printer is aware of the pending print request.

In some implementations, hosted printing service 200 may maintain multiple different print request sub-queues for each printer with which it is configured to collaborate. For example, as illustrated in FIG. 2, each print request queue 216(a)-216(m) maintained by hosted printing system 200 includes three sub-queues: an approved requests from trusted web services sub-queue (218), an approved requests from user devices sub-queue 220, and an unapproved requests from user devices sub-queue (222).

When hosted printing service 200 receives a print request to be fulfilled by a specific printer from a trusted web service and hosted printing service 200 determines that the print request is authorized, hosted printing service 200 adds the print request to the approved requests from trusted web services sub-queue 218 for the specific printer. Similarly, when hosted printing service 200 receives a print request to be fulfilled by a specific printer from an authenticated user and/or electronic user device, hosted printing service 200 adds the print request to the approved requests from user devices sub-queue 220 for the specific printer, and when hosted printing service receives a print request to be fulfilled by a specific printer from an unauthenticated user and/or electronic user device, hosted printing service 200 adds the print request to the unapproved requests from user devices sub-queue 222 for the specific printer.

In alternative implementations, hosted printing service 200 may not maintain separate print request sub-queues within the print request queues for individual printers for print requests from different origins and/or having different authorization statuses. Instead, hosted printing service 200 may maintain a single print request queue for each printer but include information about the origins and/or approval statuses of the print requests within the communications transmitted to the printers.

Figure 3:
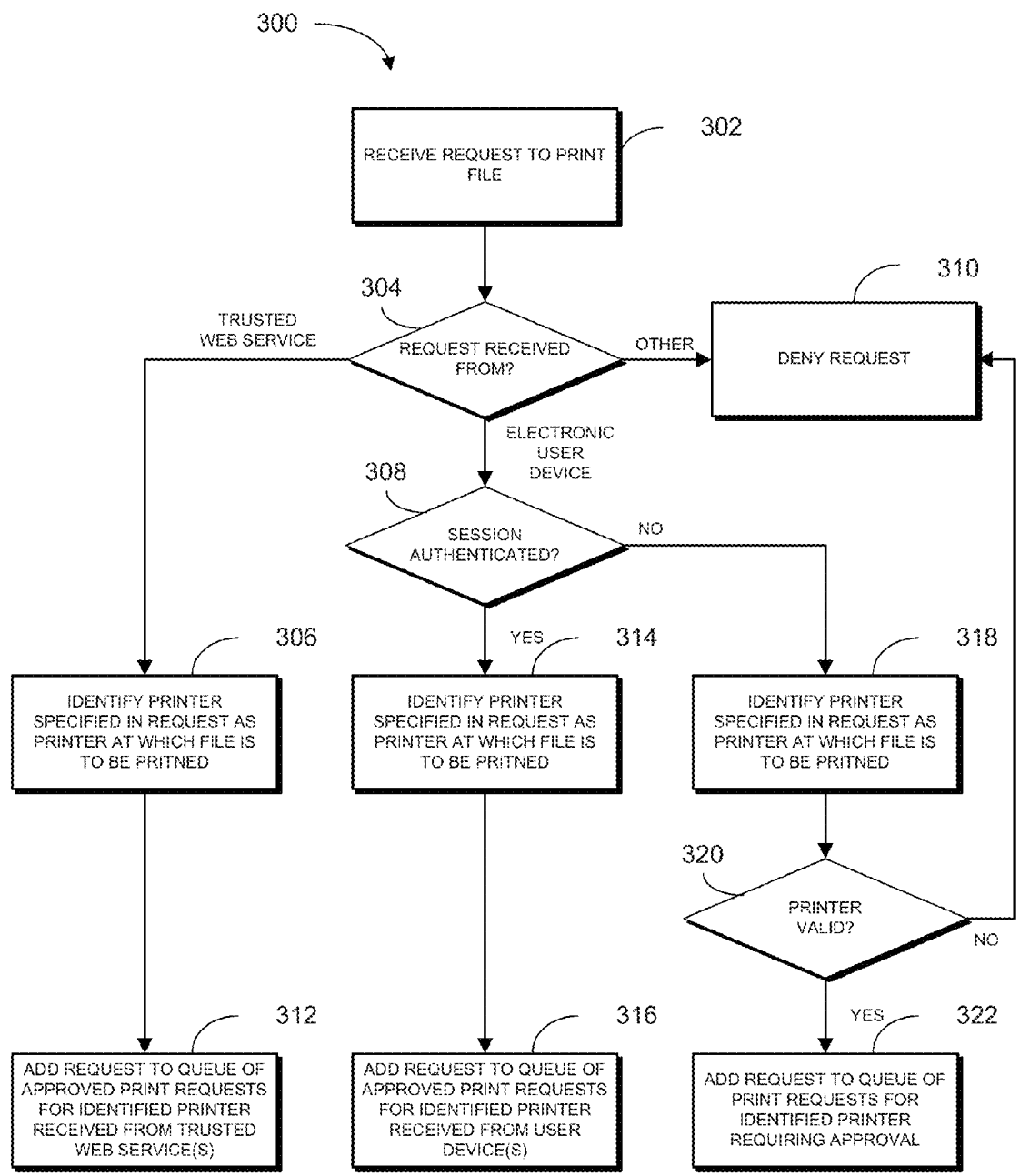
FIG. 3 is a flowchart of an example of a process for processing print requests received at a hosted printing service.

FIG. 3 is a flowchart 300 of an example of a process for processing print requests received at a hosted printing service. The process illustrated in the flowchart 300 of FIG. 3 may be performed by a hosted printing service, such as, for example, hosted printing service 100 illustrated in FIG. 1 or hosted printing service 200 illustrated in FIG. 2. Moreover, the process illustrated in the flowchart 300 of FIG. 3 may be implemented by one or more processing elements of a computing system on which a hosted printing service is running as a consequence of executing application code stored on a computer-readable storage device. The process illustrated in the flowchart 300 of FIG. 3 may be executed each time a new print request is received.

At block 302, a request to print a file is received by the hosted printing service. In response, at block 304, the hosted printing service determines from where the request was received. If the hosted printing service determines that the request was received from a trusted web service, the hosted printing service proceeds to block 306, whereas, if the request was received from an electronic user device, the hosted printing service proceeds to block 308. In the event that the request was received from an entity other than a trusted web service or an electronic user device, the hosted printing service proceeds to block 310, where the hosted printing service denies the request.

Hosted printing service may employ a variety of different techniques in order to determine whether a request to print a file was received from a trusted web service. For example, in some implementations, a request to print a file received from a web service may include an encrypted digital signature. In such implementations, when the hosted printing service receives a request to print a file from a web service, the hosted printing service may decrypt the encrypted digital signature and compare the decrypted digital signature to information stored in a web service registry (e.g., the web service registry stored on computer memory storage system 212 illustrated in FIG. 2) to determine whether the decrypted digital signature corresponds to that of a trusted web service. If the hosted printing service finds a match in the web service registry, the hosted printing service may determine that the request to print the file was received from a trusted web service. Instead of using an encrypted digital signature for authentication, the hosted printing service may require a password or other authentications information (e.g., a digital certificate) from the web service for authentication purposes.

Additionally or alternatively, the hosted printing service also may confirm that the print request received from the trusted web service originated from a user who had been authenticated by the web service prior to or as part of the submission of the print request (e.g., via verification of a valid user name or other identifier and a corresponding password). In some implementations, the hosted printing service only may establish trusted relationships with web services that only submit print requests on behalf of users whom the web service has authenticated. Alternatively, in other implementations, the hosted printing service may query the web service after receipt of a print request to confirm that the print request originated from an authenticated user or the web service may include an indication that the print request originated from an authenticated user with the initial transmission of the print request to the hosted printing service.

In the event that the hosted printing service determines that the web service from which the print request was received is not trusted by the hosted printing service and/or the print request originated from a user who has not been identified by the web service, the hosted printing service may deny the print request.

In contrast, after determining that a print request was received from a trusted web service at block 304, the hosted printing service proceeds to block 306, where the hosted printing service identifies the printer specified in the print request as the printer at which the file is to be printed. From block 306, the hosted printing service proceeds to block 312, where the hosted printing service adds the print request to a queue of print requests for the identified printer that includes approved print requests that have been received from trusted web services (e.g., approved requests from trusted web services sub-queue stored on computer-memory storage system 218 illustrated in FIG. 2).

In some implementations, one or more web services having trusted relationships with the hosted printing service only may be eligible to have print requests fulfilled by a subset of less than all of the printers with which the hosted printing service is configured to collaborate. In such cases, when the hosted printing service identifies, at block 306, the printer specified in the print request as the printer at which the file is to be printed, the hosted printing service also may consult with one or both of a printer registry (e.g., printer registry stored on computer memory storage system 208 illustrated in FIG. 2) and a web service registry (e.g., web service registry stored on computer memory storage system 212 illustrated in FIG. 2) to determine if the web service is authorized to have a print request fulfilled by the identified printer. In the event that the web service is not authorized to have a print request fulfilled at the identified printer, the hosted printing service may deny the print request. Alternatively, if the web service is authorized to have a print request fulfilled at the identified printer, the hosted printing service may proceed to block 312, where, as discussed above, the hosted printing service adds the print request to the print request queue for the identified printer. The hosted printing service, then, ultimately informs the identified printer of the pendency of this print request, and potentially other print requests that have been added to the same queue, for example by exposing the print request queue to the printer by way of the REST API.

Returning to block 304, when the hosted printing service determines that a print request was received from an electronic user device, the hosted printing service proceeds to block 308, where the hosted printing service determines if the communications session with the electronic user device from which the print request was received was an authenticated communications session.

The hosted printing service may employ a variety of different techniques in order to authenticate a communications session with an electronic user device. For example, in one implementation, the hosted printing service may require that a user of an electronic user device use the electronic user device to submit a user name or other identifier along with a password to the hosted printing service for authentication purposes. Upon receipt of a user name or other identifier and a corresponding password from the user, the hosted printing service may consult a user registry (e.g., the user registry stored on computer memory storage system 210) to confirm that the user name or other identifier and password match authentication information for a user stored in the user registry. If the user name or other identifier and password match authentication information for a user stored in the user registry, the hosted printing service may authenticate the communications session with the electronic user device. In contrast, if the user name or other identifier and password do not match authentication information for a user, the hosted printing service may refuse to authenticate the communications session with the electronic user device.

When the hosted printing service determines, at block 308, that a print request received from an electronic user device was received by way of an authenticated communications session, the hosted printing service proceeds to block 314, where the hosted printing service identifies the printer specified in the print request as the printer at which the file is to be printed. Thereafter, having identified the printer at which the file is to be printed, at block 316, the hosted printing service adds the print request to a queue of print requests for the identified printer that includes approved print requests that have been received from user devices by way of communication sessions that have been authenticated by the hosted printing service (e.g., approved requests from user devices sub-queue stored on computer-memory storage system 220 illustrated in FIG. 2). The hosted printing service, then, ultimately informs the identified printer of the pendency of this print request, and potentially other print requests that have been added to the same queue, for example by exposing the print request queue to the printer by way of the REST API.

In some implementations, one or more users who have registered with the hosted printing service only may be eligible to have print requests fulfilled by a subset of less than all of the printers with which the hosted printing service is configured to collaborate. In such cases, when the hosted printing service identifies, at block 314, the printer specified in the print request as the printer at which the file is to be printed, the hosted printing service also may consult with one or both of a printer registry (e.g., printer registry stored on computer memory storage system 208 illustrated in FIG. 2) and a user registry (e.g., user registry stored on computer memory storage system 210 illustrated in FIG. 2) to determine if the user is authorized to have a print request fulfilled by the identified printer. In the event that the user is not authorized to have a print request fulfilled at the identified printer, the hosted printing service may deny the print request. Alternatively, if the user is authorized to have a print request fulfilled at the identified printer, the hosted printing service may proceed to block 316, where, as discussed above, the hosted printing service adds the print request to the print request queue for the identified printer.

Returning to block 308, if the hosted printing service determines that a print request received from an electronic user device was received from the electronic user device by way of an unauthenticated communications session, the hosted printing service proceeds to block 318, where the hosted printing service identifies the printer specified in the print request as the printer at which the file is to be printed.

Thereafter, the hosted printing service determines, at step 320, whether the printer specified in the print request corresponds to a valid printer with which the hosted printing service is configured to collaborate to fulfill print requests. For example, in some implementations, the hosted printing service may be configured to receive print requests from electronic user devices by way of unauthenticated communications sessions that specify a network address or other identifier for a printer. In such implementations, therefore, before relaying the print request to the specified printer, the hosted printing service first confirms that the specified printer is valid and that the hosted printing service is configured to collaborate with the specified printer to fulfill print requests.

If the hosted printing service determines, at block 320, that the specified printer is not valid and/or that the hosted printing service is not configured to collaborate with the specified printer, the hosted printing service proceeds to block 310 and denies the request. Alternatively, if the hosted printing service determines, at block 320, that the specified printer is valid and/or that the hosted printing service is configured to collaborate with the specified printer to fulfill print requests, the hosted printing service proceeds to block 322, where the hosted printing service adds the print request to a queue of print requests for the specified printer that require approval prior to fulfillment by the printer (e.g., unapproved requests from user devices sub-queue stored on computer memory storage system 222(a) illustrated in FIG. 2).

When such print requests received from electronic user devices by way of unauthenticated communications sessions are added to a queue of print requests requiring approval prior to fulfillment, additional information about the print requests, such as, for example, the user and/or electronic user device from which the print request originated or the number of pages to be printed, may be included with (e.g., appended or prepended to or otherwise associated with) the print request so as to provide the entity ultimately responsible for authorizing the print request with information that may be helpful in determining whether or not to authorize the request.

Figure 4:
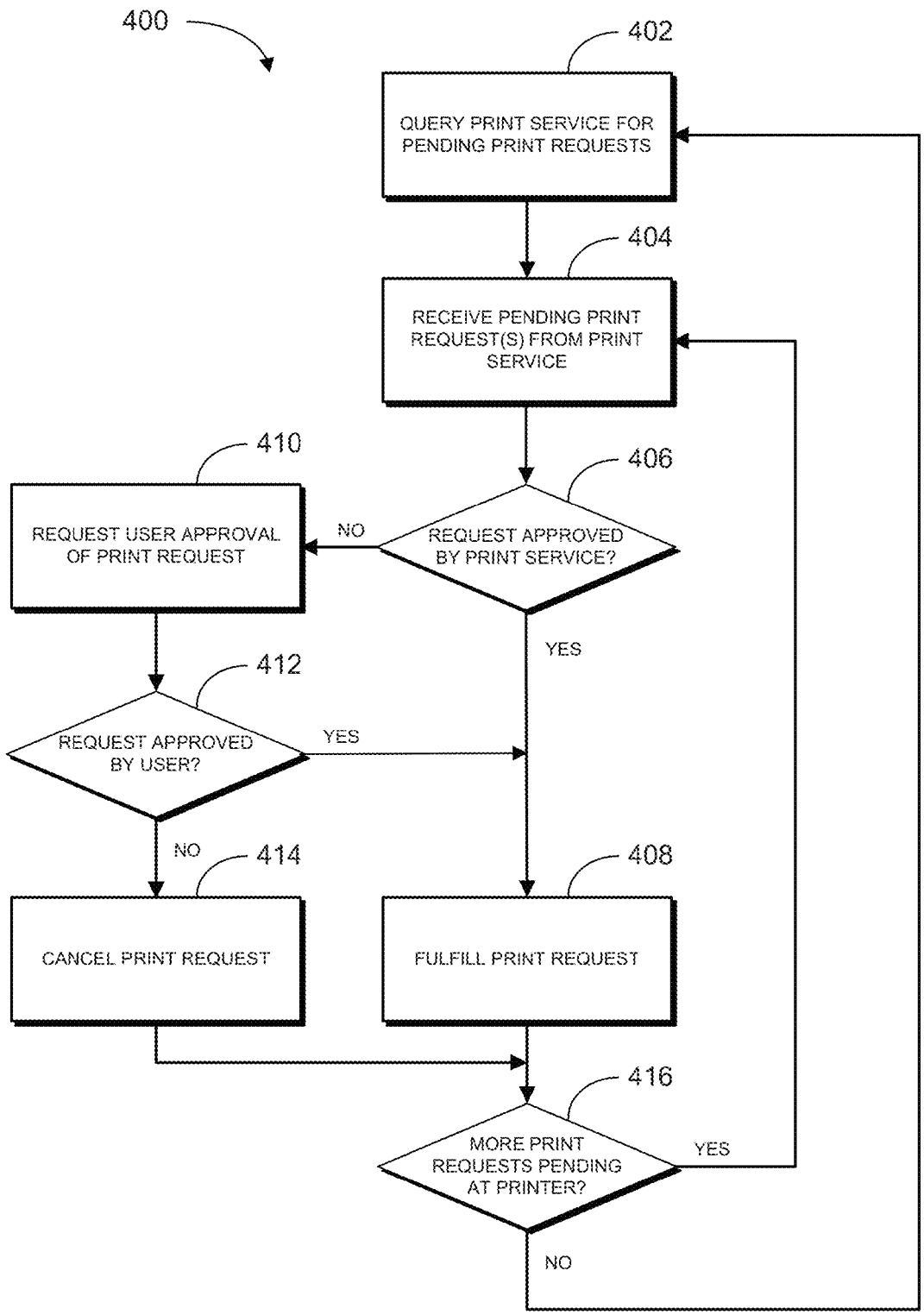
FIG. 4 is a flowchart of an example of a process for processing print requests received at a printer from a hosted printing service.

FIG. 4 is a flowchart of an example of a process for processing print requests received at a printer from a hosted printing service. The process illustrated in the flowchart 400 of FIG. 4 may be performed by a printer, such as, for example, one of printers 104(a)-104(m) illustrated in FIG. 1 and/or an external controller configured to control one of printers 104(a)-104(m) illustrated in FIG. 1. In particular, the process illustrated in the flowchart 400 of FIG. 4 may be implemented by one or more processing elements of a printer or an external printer controller as a consequence of executing instructions stored on a computer-readable storage device accessible to the printer or external printer controller.

As discussed above, in some implementations, a printer that is configured to collaborate with a hosted printing service to fulfill print requests intermittently (e.g., periodically or aperiodically) may query the hosted printing service to determine whether any print requests are pending for the printer at the hosted printing service. In some implementations, the hosted printing service and the printer both may be configured to utilize the REST API to enable such communications between the hosted printing service and the printer.

At block 402, the printer queries the hosted printing service for pending print requests, for example using one or both of the GET and RETRIEVE REST API methods. If there are print requests pending for the printer at the hosted printing service, the hosted printing service relays the pending requests, for example using the REST API to the printer, at block 404, the printer receives the pending print requests from the hosted printing service.

Thereafter, at block 406, the printer determines whether an individual one of the received print requests already has been approved by the hosted printing service. For example, as discussed above, the hosted printing service may pre-approve a print request for the printer if the print request was received by the hosted printing service from an electronic user device by way of an authenticated communications session with the electronic user device or if the print request was received by the hosted printing service from a trusted web service.

If the printer determines, at block 406, that the print request already has been approved by the hosted printing service, the printer fulfills the print request at block 408, converting the electronic version of the file into hardcopy form by rendering a visual representation of the file on a tangible substrate.

In contrast, if the printer determines, at block 406, that the print request has not already been approved by the hosted printing service, the printer, at block 410 requests manual approval of the print request. For example, in some implementations, the printer may include an incorporated display device or have access to an external display device. In such implementations, the printer may cause the display device to display information about the heretofore unapproved print request and request manual instruction from a user as to whether the print request should be fulfilled.

Figure 5:
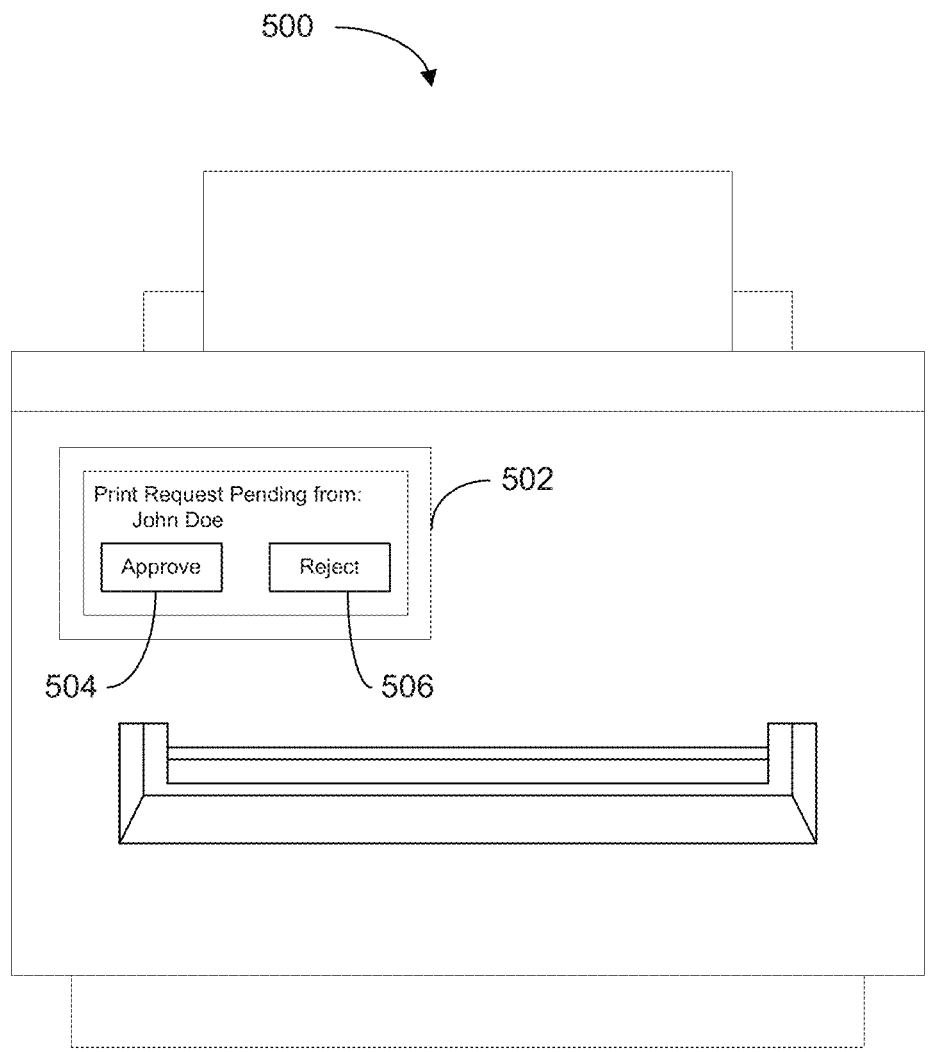
FIG. 5 is an illustration of an example of a printer.

FIG. 5 is an illustration of an example of a printer 500 having an incorporated display device 502, which, in this case, by way of example, is a touch-screen display device. When printer 500 receives a print request from the hosted printing service that has not been approved by the hosted printing service, the printer 500 causes display device 502 to display a message that includes information about the print request, for example, as illustrated in FIG. 5, the name of the user from which the print request originated (though additional information about the pending print request, including, for example, the number of pages to be printed, also could be displayed) and that requests manual instructions from a user as to whether to approve or reject the print request. In the event that an operator of printer 500 determines to approve the print request, the operator may select "Approve" button 504 on touch screen display device 502. In contrast, if the operator of printer 500 determines to deny the print request, the operator may select "Deny" button 506 on touch screen display device 502.

Referring again to FIG. 4, if, at block 412, the printer receives an indication that the print request has been approved, the printer proceeds to block 408 and fulfills the print request. Alternatively, if, at block 412, the printer receives an indication that the print request has been denied (or a predetermined period of time elapses and no decision regarding the status of the print request has been received), the printer proceeds to block 414 and cancels the print request.

In either case, after either fulfilling the print request at block 408 or canceling the print request at block 414, the printer proceeds to block 416, where the printer determines if more print requests received at the printer from the hosted printing service remain pending. If more print requests received at the printer from the hosted printing service do, in fact, remain pending, the printer returns to block 404 and repeats the process for each of the remaining pending print requests. Alternatively, if no print requests received at the printer from the hosted printing service remain pending, the printer returns to block 402, where the printer once again queries the hosted print service for pending print requests.

A number of methods, techniques, systems, and apparatuses have been described. The described methods, techniques, systems, and apparatuses may be implemented in digital electronic circuitry or computer hardware, for example, by executing instructions stored in computer-readable storage media.

Apparatuses implementing these techniques may include appropriate input and output devices, a computer processor, and/or a tangible computer-readable storage medium storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including by way of example semiconductor memory devices, such as Erasable Programmable Read-Only Memory (EPROM), Electrically Erasable Programmable Read-Only Memory (EEPROM), and flash memory devices; magneto-optical disks; and Compact Disc Read-Only Memory (CD-ROM). Any of the foregoing may be supplemented by, or incorporated in, specially designed application-specific integrated circuits (ASICs).

Although the operations of the disclosed techniques may be described herein as being performed in a certain order, in some implementations, individual operations may be rearranged in a different order and/or eliminated and the desired results still may be achieved. Similarly, components in the disclosed systems may be combined in a different manner and/or replaced or supplemented by other components and the desired results still may be achieved.

What is claimed is:

1. A computer system hosting a printing service, the computer system comprising:
   one or more processing elements; and
   a computer memory storage system storing instructions that, when executed by the one or more processing elements, cause the one or more processing elements to:
      receive, over a public network and from a subset of other electronic devices, authentication credentials for users of the subset of electronic devices,
      validate the authentication credentials received for the users of the subset of the other electronic devices,
      in response to validating the authentication credentials for the users of the subset of the other electronic devices, establishing sessions with the users via corresponding ones of the subset of electronic devices,
      receive, over a public network, requests to print files at individual printers on behalf of the other electronic devices, at least some of the printers not being accessible to at least some of the other electronic devices over a public network,
      for each of multiple received requests to print files at printers:
         identify a particular printer at which the file is to be printed, and
         determine whether the request was received from an application that is executing on a remote computer system and that is known to be trusted by the computer system hosting the printing service, from one of the subset of the other electronic devices from which authentication credentials for a user were received and with which a session remains active, or from an electronic device with which no active session is in progress,
      for a first request to print a first file at a specific printer determined to be received from an application that is known to be trusted by the computer system hosting the printing service, add an indication of the first request to a first queue corresponding to print requests to be fulfilled by the specific printer,
      for a second request to print a second file at the specific printer determined to be received from one of the subset of the other electronic devices from which authentication credentials for a user were received and with which a session remains active, add an indication of the second request to a second queue corresponding to print requests to be fulfilled by the specific printer,
      for a third request to print a third file at the specific printer determined to be received from one of the other electronic devices with which no active session is in progress, add an indication of the third request and an indication of a source from which the third request was received to a third queue corresponding to print requests to be fulfilled by the specific printer after approval by the specific printer, and expose, to the specific printer, the first queue including the indication of the first request, the second queue including the indication of the second request, and the third queue including the indication of the third request and the indication of the source from which the third request was received.

2. The computer system of claim 1 wherein:

the instructions that, when executed by the one or more processing elements, cause the one or more processing elements to add an indication of the third request and an indication of a source from which the third request was received to the third queue include instructions that, when executed by the one or more processing elements, cause the one or more processing elements to add an indication of a user identity from which the third request was received to the third queue; and the instructions that, when executed by the one or more processing elements, cause the one or more processing elements to expose, to the specific printer, the third queue including the indication of the third request and the indication of the source from which the third request was received include instructions that, when executed by the one or more processing elements, cause the one or more processing elements to expose, to the specific printer, the third queue including the indication of the third request and the indication of the user identity from which the third request was received.

\* \* \* \* \*